US008658717B2

(12) United States Patent
Rotz et al.

(10) Patent No.: US 8,658,717 B2
(45) Date of Patent: Feb. 25, 2014

(54) ASPHALT PAVING MATERIALS AND METHODS FOR MAKING THE SAME

(75) Inventors: Steven Rotz, Randolph, NJ (US); Scott Hacker, River Edge, NJ (US); Yonghong Ruan, Wayne, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/350,393

(22) Filed: Jan. 13, 2012

(65) Prior Publication Data

US 2012/0196959 A1 Aug. 2, 2012

Related U.S. Application Data

(60) Provisional application No. 61/437,265, filed on Jan. 28, 2011.

(51) Int. Cl.
C08L 95/00 (2006.01)
(52) U.S. Cl.
USPC .................................................. 524/59
(58) Field of Classification Search
USPC ................................ 524/59, 70, 71
See application file for complete search history.

(56) References Cited

U.S. PATENT DOCUMENTS

| | | | |
|---|---|---|---|
| 4,242,143 | A | 12/1980 | Hagenbach et al. |
| 4,328,147 | A | 5/1982 | Chang et al. |
| 4,496,622 | A | 1/1985 | Chang et al. |
| 5,302,638 | A | 4/1994 | Ho et al. |
| 6,074,469 | A | 6/2000 | Collins et al. |
| 6,358,621 | B1 | 3/2002 | Hughes et al. |
| 6,384,112 | B1 | 5/2002 | Boussad |
| 6,414,056 | B1 | 7/2002 | Puzic et al. |
| 7,202,290 | B2 | 4/2007 | Stuart, Jr. et al. |
| 7,439,286 | B2 | 10/2008 | Stuart, Jr. et al. |
| 8,198,350 | B2 | 6/2012 | Fee et al. |
| 2002/0042477 | A1 | 4/2002 | Jelling et al. |
| 2005/0101701 | A1 | 5/2005 | Stuart, Jr. et al. |
| 2005/0101702 | A1 | 5/2005 | Stuart, Jr. et al. |
| 2006/0223916 | A1 | 10/2006 | Stuart, Jr. et al. |
| 2011/0020537 | A1 | 1/2011 | Reinke |
| 2011/0196073 | A1* | 8/2011 | Fee et al. .................. 524/68 |
| 2011/0269876 | A1 | 11/2011 | Rowe et al. |
| 2012/0167802 | A1 | 7/2012 | Huh |
| 2012/0196959 | A1 | 8/2012 | Rotz et al. |

FOREIGN PATENT DOCUMENTS

| | | |
|---|---|---|
| CA | 2354750 C | 9/2009 |
| CN | 101974235 A | 2/2011 |
| CN | 102337036 A | 2/2012 |
| EP | 424213 A1 | 4/1991 |
| EP | 837185 A1 | 4/1998 |
| EP | 2213704 A1 | 8/2010 |
| JP | 2002121388 A | 4/2002 |
| RU | 2348662 C2 | 3/2009 |
| WO | 0023522 A1 | 4/2000 |
| WO | 2006107179 A2 | 10/2006 |

OTHER PUBLICATIONS

Won, M., et al, "Effect of Antistrip Additives on the Properties of Polymer-Modified Asphalt Binders and Mixtures," Transportation Research Board, 1436, p. 108-114, 1994.
Lee, N., et al., "Low-Temperature Fracture Toughness of Polyethylene-Modified Asphalt Binders," Transportation Research Board, 1436, p. 54-59, 1994.
Yang P., "Pavement of high modulus asphalt mixtures modified by PE and SBS", Zhongnan Daxue Xuebao (Ziran Kexue Ban)/Journal of Central South University (Science and Technology), vol. 43, Issue 10, Oct. 2012, pp. 4044-4049.
Jeong, K.D., Laboratory evaluation of flexible pavement materials containing waste polyethylene (WPE) film, Construction and Building Materials, vol. 25, Issue 4, Apr. 2011, pp. 1890-1894.
Singh, B. "Polymer-modified bitumen of recycled LDPE and maleated bitumen", Journal of Applied Polymer Science, vol. 127, Issue 1, Jan. 5, 2013, pp. 67-78.
Shang, L., "Pyrolyzed wax from recycled cross-linked polyethylene as warm mix asphalt (WMA) additive for SBS modified asphalt", Construction and Building Materials, vol. 25, Issue 2, Feb. 2011, pp. 886-891.
Kumar, P., "Strength characteristics of polymer modified mixes", International Journal of Pavement Engineering, vol. 7, Issue 1, Mar. 2006, pp. 63-71.
Kim, K.W., "Fracture toughness of polymer-modified asphalt concrete at low temperatures", Canadian Journal of Civil Engineering, vol. 30, Issue 2, Apr. 2003, pp. 406-413.
Gao, G. "Enhanced performance of LDPE/SBS blend modified asphalt through dynamic vulcanization" Polymers and Polymer Composites, vol. 10, Issue 6, 2002, pp. 433-440.
Gao, G., "Improved storage stability of LDPE/SBS blends modified asphalts" Polymers and Polymer Composites, vol. 10, Issue 3, 2002, pp. 229-236.
Zhang, R.H., "Rubber modified asphalt mixture properties and mechanical testing", Applied Mechanics and Materials, vol. 105-107, 2012, pp. 810-817.
The International Search Report mailed Sep. 20, 2012 in International Application No. PCT/US2012/022535.

* cited by examiner

*Primary Examiner* — Peter Szekely
(74) *Attorney, Agent, or Firm* — Ingrassia, Fisher & Lorenz

(57) ABSTRACT

An asphalt paving material comprises an asphalt binder present in an amount of from about 3 to about 8 weight percent of the asphalt paving material. The asphalt binder comprises base asphalt and oxidized polyolefin that is present in an amount of from about 0.25 to about 10 weight percent of the base asphalt. Aggregate is present in an amount of about 92 to about 97 weight percent of the asphalt paving material. The oxidized polyolefin effectively adheres the asphalt binder to the aggregate so as to resist stripping of the asphalt binder from the aggregate caused by moisture.

12 Claims, 3 Drawing Sheets

ASPHALT PAVING MATERIALS AND METHODS FOR MAKING THE SAME

CROSS-REFERENCE TO RELATED APPLICATIONS

This application is related to and claims all available benefit of U.S. Provisional Patent Application 61/437,265 filed Jan. 28, 2011, the entire contents of which are herein incorporated by reference.

FIELD OF THE INVENTION

The present invention relates generally to asphalt paving materials and methods for making asphalt paving materials, and more particularly relates to asphalt paving materials that exhibit resistance to "rutting" and have improved adhesion between an asphalt binder and aggregate, and methods for making such asphalt paving materials.

BACKGROUND OF THE INVENTION

Asphalt mixes are commonly used as paving materials for road construction and maintenance. Typically, asphalt, often referred to as "asphalt binder" or "asphalt cement," is mixed with aggregate to form material used in asphalt paving. Processing and use of this material by paving crews yields asphalt pavement. The asphalt pavement comprises aggregate held within a continuous phase of the asphalt binder by adherence of the asphalt binder to the aggregate.

The strength and durability of the asphalt pavement depends on various factors such as the properties of the materials used, the interaction of the various materials, the mix design, construction practices and the environment and traffic conditions that the pavement is exposed to. To produce a mix that will have good performance during the lifetime of the pavement, it is important to attain proper coating of the aggregate with the asphalt with the optimum asphalt binder film thickness, good adhesion of the asphalt onto the aggregate, and good cohesive strength of the asphalt.

Conventional pavements suffer from various types of distress modes such as permanent deformation, cohesive strength, oxidation and moisture damage. Permanent deformation is a significant problem for asphalt pavement. A road may be about 80 to about 100° F. or more warmer in the summer than it is in the winter. At warmer temperatures, asphalt pavement softens and can creep and move creating ridges and ruts, often referred to as "rutting," under the weight of heavy trucks passing over it or traffic that has temporarily stopped, such as, for example, at a traffic light intersection, since rutting is dependent on both the weight of the vehicle and the time duration of the weight application. To reduce or prevent rutting, polymers or other materials having a relatively higher modulus than the asphalt, or that can produce a higher modulus asphalt binder at warmer temperatures than the asphalt, are often incorporated into conventional asphalt binders. Typical polymers used to modify asphalt binders to reduce or prevent rutting include elastomers, such as, for example, styrene/butadiene/styrene copolymer (SBS), and plastomers, such as, for example, polyethylene, ethyl/vinyl acetate copolymer (EVA), and the like.

Moisture damage is also a significant problem for conventional asphalt pavement. Because water has a higher affinity for the aggregate surface than does the asphalt binder and because there is effectively no or little chemical bonding between the asphalt binder and the aggregate surface, water can at times displace the asphalt binder from the aggregate surface causing moisture damage. This is known as "stripping." To reduce or prevent stripping, anti-stripping additives are often incorporated into conventional asphalt binders. Common anti-stripping additives include amines that typically contain long, non-polar fatty chains that exhibit a high affinity for the asphalt binder. The molecular structures of these amines tend to increase the strength of the adhesive bond between the binder and the aggregate.

Unfortunately, the additives used to reduce or prevent stripping typically do not reduce or prevent rutting; similarly, the polymers used to reduce or prevent rutting typically do not reduce or prevent stripping. This can lead to more complex and costly asphalt pavement compositions that include both anti-stripping additives and anti-rutting polymers for resistance to stripping and rutting.

Accordingly, it is desirable to provide asphalt paving materials that include a polymer additive that is effective for reducing or preventing both stripping and rutting. In addition, it is desirable to provide methods for making such asphalt paving materials.

SUMMARY OF THE INVENTION

Asphalt paving materials and methods for preparing asphalt paving materials are provided herein. In accordance with an exemplary embodiment, an asphalt paving material comprises an asphalt binder present in an amount of from about 3 to about 8 wt. % of the asphalt paving material. The asphalt binder comprises base asphalt and an oxidized polyolefin that is present in an amount of from about 0.25 to about 10 wt. % of the base asphalt. Aggregate is present in an amount of from about 92 to about 97 wt. % of the asphalt paving material. The oxidized polyolefin effectively adheres the asphalt binder to the aggregate so as to resist stripping of the asphalt binder from the aggregate caused by moisture.

In accordance with another exemplary embodiment, a method for preparing an asphalt paving material is provided. The method comprises the step of mixing asphalt binder and aggregate at conditions effective to form the asphalt paving material. The asphalt binder is present in an amount of from about 3 to about 8 wt. % of the asphalt paving material and the aggregate is present in an amount of from about 92 to about 97 wt. % of the asphalt paving material. The asphalt binder comprises base asphalt and an oxidized polyolefin that is present in an amount of from about 0.25 to about 10 wt. % of the base asphalt. The oxidized polyolefin effectively adheres the asphalt binder to the aggregate so as to resist stripping of the asphalt binder from the aggregate caused by moisture.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION

Figure 1:
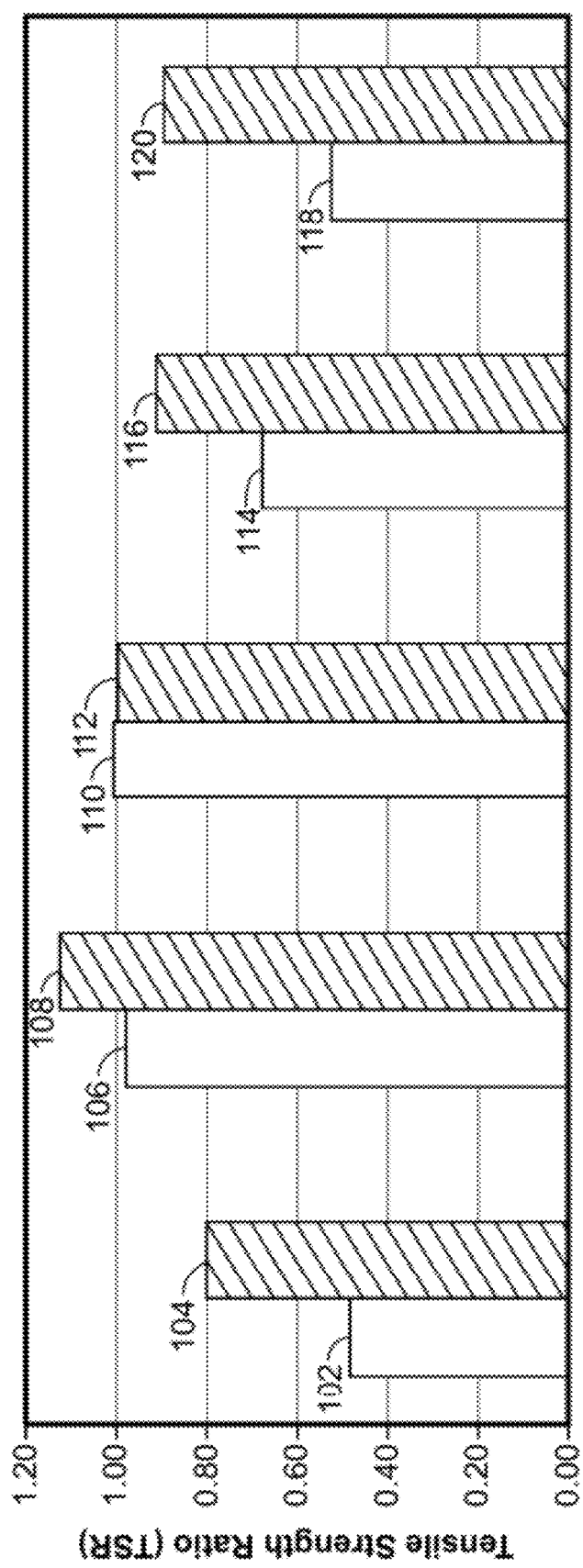
FIG. 1 is a graphical comparison of the tensile strength ratios of various asphalt paving materials in accordance with an exemplary embodiment.

The following Detailed Description is merely exemplary in nature and is not intended to limit the invention or the application and uses of the invention. Furthermore, there is no intention to be bound by any theory presented in the preceding Background of the Invention or the following Detailed Description.

The various embodiments contemplated herein relate to asphalt paving materials that exhibit resistance to rutting and have improved adhesion between an asphalt binder and aggregate for resistance to stripping. In an exemplary embodiment, the asphalt paving material comprises an asphalt binder and aggregate. The asphalt binder comprises base asphalt (e.g. neat or unmodified asphalt) and an oxidized polyolefin. The inventors have found that oxidized polyolefins are suitable plastomers for modifying the asphalt binder to reduce or prevent permanent deformation of the asphalt pavement at warmer temperatures. In addition, the inventors have also found that oxidized polyolefins act as adhesion promoters between the asphalt binder and the aggregate so as to improve the resistance of the asphalt pavement to moisture damaged caused by stripping. Thus, the asphalt paving material includes an oxidized polyolefin that is effective for reducing or preventing both stripping and rutting, and preferably provides a simplified material that is less costly to produce.

In an exemplary embodiment, the asphalt paving material comprises an asphalt binder present in an amount of from about 3 to about 8 weight percent (wt. %) of the asphalt paving material. The asphalt binder comprises base asphalt and an oxidized polyolefin that is present in an amount of from about 0.25 to about 10 wt. %, and preferably of from about 0.5 to about 4 wt. %, and more preferably of from about 1 to about 4 wt. %, of the base asphalt.

Asphalt is defined by the ASTM as a dark brown to black cementitious material in which the predominant constituents are bitumens that occur in nature or are obtained in petroleum processing. Asphalts characteristically contain saturates, aromatics, resins and asphaltenes.

All types of asphalt, naturally occurring, synthetically manufactured and modified, may be used in accordance with the asphalt paving materials contemplated herein. Naturally occurring asphalt is inclusive of native rock asphalt, lake asphalt, and the like. Synthetically manufactured asphalt is often a byproduct of petroleum refining or post refining operations and includes air-blown asphalt, blended asphalt, cracked or residual asphalt, petroleum asphalt, propane asphalt, straight-run asphalt, thermal asphalt, and the like. Modified asphalt includes base asphalt (e.g. neat or unmodified asphalt that can be naturally occurring or synthetically manufactured) modified with elastomers, phosphoric acid, polyphosphoric acid, plastomers, ethylene/vinyl acetate copolymer, and the like, or various combinations of these modifiers. Non-limiting examples of elastomers suitable for modifying the base asphalt include natural or synthetic rubbers including ground tire rubber, butyl rubber, styrene/butadiene rubber (SBR), styrene/ethylene/butadiene/styrene terpolymers (SEBS), polybutadiene, polyisoprene, ethylene/propylene/diene (EPDM) terpolymers, ethylene/n-butyl acrylate/glycidyl methacrylate terpolymers, and styrene/conjugated diene block or random copolymers, such as, for example, styrene/butadiene including styrene/butadiene/styrene copolymer (SBS), styrene/isoprene, and styrene/isoprene-butadiene block copolymer. The block copolymers may be branched or linear and may be a diblock, triblock, tetrablock or multiblock.

Preferably, the oxidized polyolefin is an oxidized polyethylene, an oxidized polypropylene, and mixtures thereof, and more preferably is an oxidized polyethylene. In one example, the oxidized polyolefin is oxidized polyethylene homopolymer. In another example, the oxidized polyolefin is an oxidized high density polyethylene preferably having a density of from about 0.95 to about 1 g/cc. Two such suitable oxidized polyolefins are Honeywell Titan™ 7817 and Honeywell Titan™ 7686 oxidized high-density polyethylene homopolymers, manufactured by Honeywell International Inc., which is headquartered in Morristown, N.J.

In an exemplary embodiment, the oxidized polyolefin has a molecular weight of from about 1000 to about 30,000 Daltons, and more preferably of from about 1000 to about 10,000 Daltons. Further, the degree of oxidation, e.g., carboxyl group content, of the oxidized polyolefin may be characterized by titrating a solution of the oxidized polymer with a 0.1 N alcoholic potassium hydroxide (KOH) solution to a visual "pink" end point using phenolphthalein as an indicator to determine the total acid content or acid number of the oxidized polyolefin. Preferably, the oxidized polyolefin has an acid number of from about 5 to about 50 (e.g. acid value of about 5 to about 50 mg KOH/g), and more preferably of from about 15 to about 40 (e.g. acid value of about 15 to about 40 mg KOH/g).

The asphalt paving material also comprises aggregate. "Aggregate" is a collective term for mineral materials, such as, for example, sand, gravel, or crushed stone that are combined with the asphalt binder to form the asphalt paving material. The aggregate may comprise natural aggregate, manufactured aggregate, or a combination thereof. Natural aggregate is typically extracted rock from an open excavation (e.g. a quarry) that is reduced to usable sizes by mechanical crushing. Manufactured aggregate is typically a byproduct of other manufacturing processes such as slag from metallurgical processing (e.g. steel, tin, and copper production). Manufactured aggregate also includes specialty materials that are produced to have a particular physical characteristic not found in natural rock, such as, for example, low density. In an exemplary embodiment, the asphalt paving material comprises aggregate that is present in an amount of from about 92 to about 97 wt. % of the asphalt paving material.

In a preferred embodiment, the asphalt paving material consists essentially of asphalt binder and aggregate, and the asphalt binder consists essentially of base asphalt and oxidized polyolefin with substantially no typical anti-stripping agent. The term "substantially no anti-stripping agent" as used herein means the anti-stripping agent, if present, is not used in an amount that will meet industry standards resistance to moisture damage. Two such suitable tests for determining the resistance of an asphalt paving material to moisture damage are specified in AASHTO T-283 and ASTM D 4867 standard procedures. Various types of typical anti-stripping agents include amines such as polyamines and polyalkylenepolyamine, modified amines such as polyamines reacted with fatty acids, lime (CaO) including hydrated lime (Ca(OH)$_2$), phosphoric acid, acrylic polymer including styrene-acrylic polymer, or combinations and/or derivatives thereof. In an alternative embodiment, the asphalt binder may include an anti-rutting polymer and/or elastomer, such as, for example, SBS present in an amount of from about 0.5 to about 5 wt. % of the base asphalt.

In an exemplary embodiment, a method for preparing asphalt paving materials as discussed in the foregoing paragraphs is provided. The method includes heating and drying aggregate at a temperature of from about 120 to about 190° C. In one example, the aggregate is heated and dried by conventional means, continuous or batch, such as, for example, in a drum-mixer by hot gases. Base or modified asphalt is heated separately from the aggregate to a liquidus state at a temperature of from about 120 to about 190° C.

In one embodiment, oxidized polyolefin is added to the hot liquid asphalt to form a hot liquid asphalt binder. The hot asphalt binder is then combined with the heated aggregate in the conventional continuous or batch operations where the asphalt binder and the aggregate are mixed at a temperature of from about 120 to about 190° C. to form a hot mix asphalt paving material.

In another embodiment, the oxidized polyolefin is initially combined with the heated aggregate in the drum-mixer where the heated aggregate melts the oxidized polyolefin. In this embodiment, the conventional continuous or batch operation mixes the hot aggregate with the melting oxidized polyolefin such that the oxidized polyolefin coats the surface of the aggregate. The hot liquid asphalt is then combined with the oxidized polyolefin-coated aggregate in the drum-mixer and the combined ingredients are mixed at a temperature of from about 120 to about 190° C. to form a hot mix asphalt paving material. During the mixing process, the oxidized polyolefin transfers and/or diffuses from the aggregate into the hot liquid asphalt to form a continuous hot liquid asphalt binder phase.

Referring to FIG. 1, a graphical representation of the results of a moisture damage study of various asphalt paving materials is provided. In particular, the effects of two different polymers, Honeywell Titan™ 7686 oxidized high-density polyethylene homopolymer and Honeywell Titan™ 7205 mid-density polyethylene homopolymer (manufactured by Honeywell International Inc. headquartered in Morristown, N.J.), on moisture susceptibility of asphalt mixtures were evaluated in this study. A fine graded, heavy traffic, asphalt paving mixture designed to meet Wisconsin DOT requirements was used as a base composition for the study. The aggregate used to form the asphalt paving mixtures was granite aggregate from a prominent aggregate source in North Central Wisconsin. The moisture damage testing was conducted using the procedure specified in the AASHTO T-283 standard procedure.

The effects of the Honeywell Titan™ 7686 oxidized high-density polyethylene homopolymer and Honeywell Titan™ 7205 mid-density polyethylene homopolymer were evaluated when used alone in the asphalt mixtures, and when used in combination with SBS polymer. The results were also compared to an asphalt mixture produced with an asphalt binder consisting of base asphalt modified only with SBS. Testing also included asphalt mixtures including a polyamine anti-stripping agent of KLING BETA 2250 manufactured by Akzo Noble N.V., which is headquartered in Amsterdam, Netherlands. In the samples containing the polyamine anti-stripping agent, the anti-stripping agent was present in amounts of about 0.5 wt. % of the base asphalt.

Per the AASHTO T-283 standard procedure, moisture susceptibility testing quantifies moisture damage as the ratio of indirect tensile strength of conditioned to unconditioned asphalt paving samples. All testing was conducted at about 25° C. using samples compacted to about 7%+/−1% air void content. For the conditioned samples, the standard procedure requires vacuum saturation to levels of percent saturation ranging from about 55 to about 85% followed by full immersion in a water bath at about 60° C. for about 24 hours.

As illustrated, the first two bars 102 and 104 represent the tensile strength ratios of asphalt paving mixtures including SBS present in an amount of about 4.5 wt. % of the base asphalt without the anti-stripping agent and with the anti-stripping agent, respectively. The second two bars 106 and 108 represent the tensile strength ratios of asphalt paving mixtures including Honeywell Titan™ 7686 oxidized high-density polyethylene homopolymer present in an amount of about 3.5 wt. % of the base asphalt without the anti-stripping agent and with the anti-stripping agent, respectively. The third two bars 110 and 112 represent the tensile strength ratios of asphalt paving mixtures including SBS present in an amount of about 1 wt. % and Honeywell Titan™ 7686 oxidized high-density polyethylene homopolymer present in an amount of about 2.5 wt. % of the base asphalt without the anti-stripping agent and with the anti-stripping agent, respectively. The fourth two bars 114 and 116 represent the tensile strength ratios of asphalt paving mixtures including Honeywell Titan™ 7205 mid-density polyethylene homopolymer present in an amount of about 6 wt. % of the base asphalt without the anti-stripping agent and with the anti-stripping agent, respectively. The fifth two bars 118 and 120 represent the tensile strength ratios of asphalt paving mixtures including SBS present in an amount of about 1 wt. % and Honeywell Titan™ 7205 mid-density polyethylene homopolymer present in an amount of about 3.5 wt. % of the base asphalt without the anti-stripping agent and with the anti-stripping agent, respectively.

Per Wisconsin DOT requirements, asphalt paving mixtures without anti-stripping additives having AASHTO T-283 tensile strength ratios of at least 0.70 are considered acceptable for road construction and/or maintenance, and asphalt paving mixtures with anti-stripping additives having AASHTO T-283 tensile strength ratios of at least 0.75 are considered acceptable for road construction and/or maintenance. As indicated, the asphalt mixtures comprising SBS and/or Honeywell Titan™ 7205 mid-density polyethylene homopolymer without the anti-stripping agent represented by bars 102, 114 and 118 had tensile strength ratios of about 0.5, 0.68 and 0.52, respectively, and therefore were found to be unacceptable for road construction and/or maintenance. However, the asphalt mixtures comprising Honeywell Titan™ 7686 oxidized high-density polyethylene homopolymer either with or without SBS and without the anti-stripping agent represented by bars 106 and 110 had tensile strength ratios of about 0.99 and 1.01, respectively, and therefore were found to be acceptable for road construction and/or maintenance.

In an exemplary embodiment, the asphalt paving material includes an asphalt binder and aggregate where the asphalt binder includes base asphalt and oxidized polyolefin with substantially no typical anti-stripping agent. The asphalt paving material has an AASHTO T-283 tensile strength ratio of at least about 0.65, and preferably of at least about 0.75, and more preferably of at least about 0.85, and most preferably of at least about 0.95.

Figure 2:
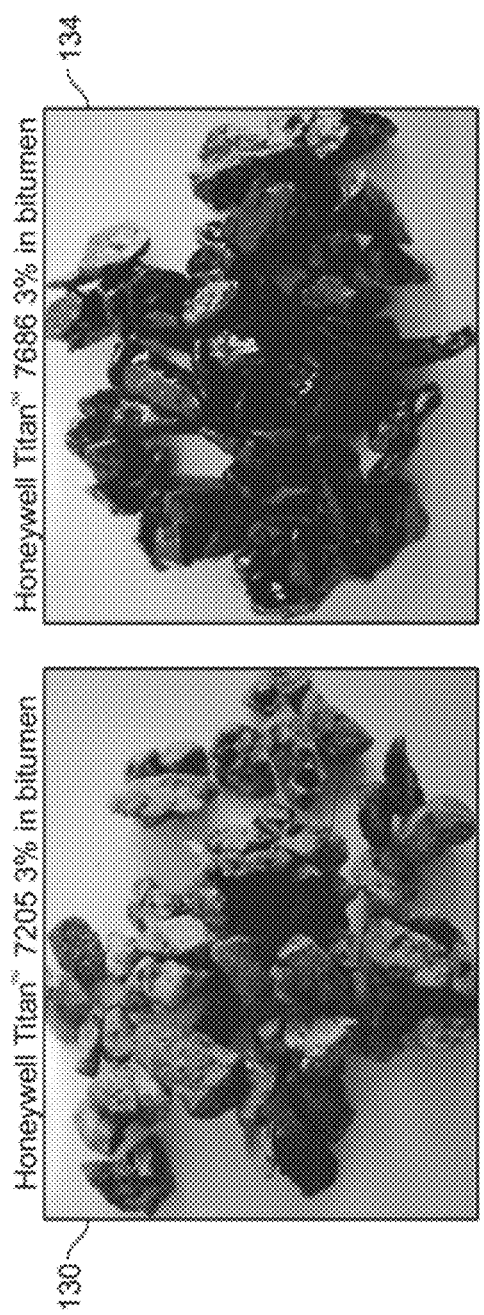
FIG. 2 includes photos of samples of aggregate that were coated with various asphalt binders and then subjected to a boiling water test in accordance with an exemplary embodiment.
Figure 2:
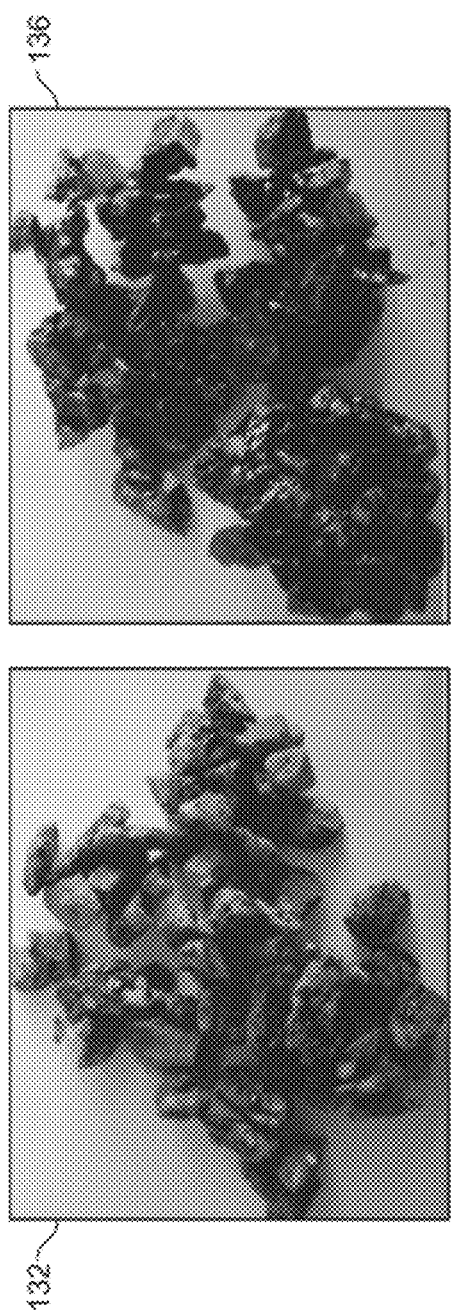

Referring to FIG. 2, photos of samples of aggregate that were coated with various asphalt binders and then subjected to a boiling water test in accordance with an exemplary embodiment are provided. Samples of various asphalt paving materials using North West Russian granite aggregate were formed. In particular, the sample corresponding to photo 130 was formed with aggregate coated with an asphalt binder comprising base asphalt and Honeywell Titan™ 7205 that was present in an amount of about 3 wt. % of the base asphalt. The sample corresponding to photo 132 was formed with aggregate coated with an asphalt binder comprising base asphalt and SBS that was present in an amount of about 3 wt. % of the base asphalt. The sample corresponding to photo 134 was formed with aggregate coated with an asphalt binder comprising base asphalt and Honeywell Titan™ 7686 that was present in an amount of about 3 wt. % of the base asphalt. The sample corresponding to photo 136 was formed with aggregate coated with an asphalt binder comprising base asphalt and SBS and Honeywell Titan™ 7686 that were present in amounts of about 2.25 and 0.75 wt. % of the base asphalt, respectively.

The samples were each placed separately into boiling water for about 10 minutes and were then removed and allowed to cool. As illustrated in photos 130 and 132, the asphalt paving material samples containing Honeywell Titan™ 7205 and SBS in the asphalt binder without Honeywell Titan™ 7686 (e.g. oxidized polyethylene) had substantial areas of exposed aggregate surface, indicating that much of the asphalt binder had been stripped from the aggregate surfaces during the boiling test. To the contrary, the aggregate of the asphalt paving material samples illustrated in photos 134 and 136 containing Honeywell Titan™ 7686 in the asphalt binder were substantially black in coloration, indicating that the asphalt binder was still in place and had excellent adhesion to the aggregate surfaces. Thus, the Honeywell Titan™ 7686 oxidized polyethylene effectively adhered the asphalt binder to the aggregate to resist stripping of the asphalt binder from the aggregate during the boiling test.

Figure 3:
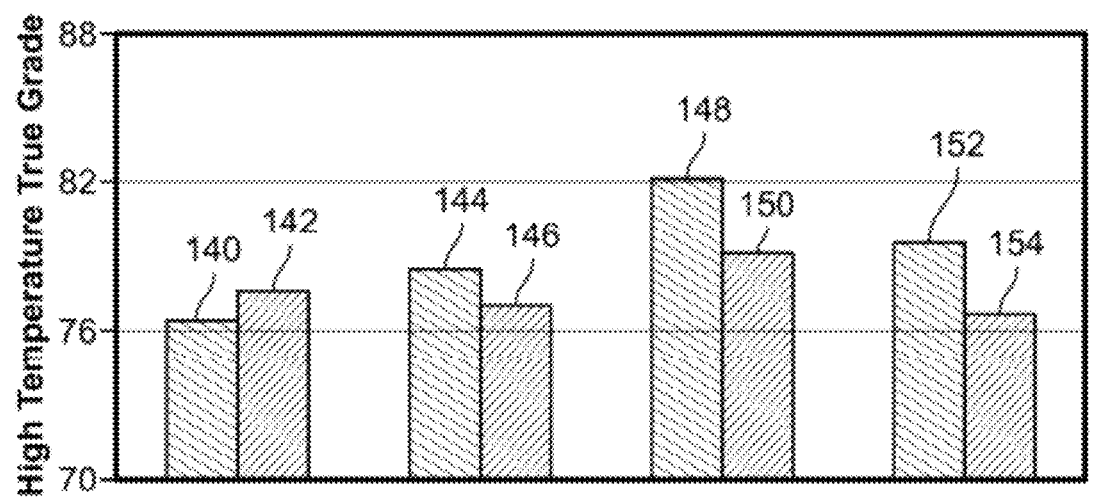
FIG. 3 is a graphical comparison of the high temperature true grade of various asphalt paving materials in accordance with an exemplary embodiment.

Referring to FIG. 3, a graphical comparison of the high temperature true grade of various asphalt paving material samples in accordance with an exemplary embodiment is provided. The paving grade of asphalt cement is described in terms of the performance grade (PG) that is defined by two numbers which represent pavement temperatures. These numbers are determined using the AASHTO M320 standard procedure. The first number PG 64-XX represents the high pavement temperature (or "high temperature true grade") in degrees Celsius and the second number PG XX-22 represents the low pavement temperature. The high pavement temperature relates to the effects of rutting and the low pavement temperature relates to cold temperature cracking. The higher the high pavement temperature is of a performance grade (indicated by the first number), the more resistant the asphalt cement is to rutting. For example, asphalt cement that has a performance grade of PG 76-22 (e.g. high temperature true grade of 76) is more resistant to rutting than asphalt cement that has a performance grade of PG 64-22 (e.g. high temperature true grade of 64).

The asphalt paving material samples illustrated in FIG. 3 were prepared using an asphalt pavement formulation having a performance grade of PG 64-22 that was also modified with the addition of the following to improve resistance to rutting: SBS present in an amount of about 4.5 wt. % of the base asphalt for samples corresponding to the first two bars 140 and 142; SBS and Honeywell Titan™ 7686 present in amounts of about 1 and 2.5 wt. %, respectively, of the base asphalt for the samples corresponding to the second two bars 144 and 146; Honeywell Titan™ 7686 present in an amount of about 3.5 wt. % of the base asphalt for the samples corresponding to the third two bars 148 and 150; and SBS and Honeywell Titan™ 7205 present in amounts of about 1 and 3.5 wt. %, respectively, of the base asphalt for the samples corresponding to the fourth two bars 152 and 154. Also, in accordance with AASHTO M320 standard procedure, the samples corresponding to the bars 140, 144, 148 and 152 were non-aged asphalt paving material samples, and the samples corresponding to bars 142, 146, 150 and 154 were short-term heat aged samples at about 163° C. for about 85 minutes.

As illustrated, in all cases, the samples exhibited high temperature true grade values of greater than 76 indicating that the asphalt paving materials would have relatively good resistance to rutting and have corresponding performance grades of at least PG 76-22. In particular, the samples containing Honeywell Titan™ 7686 present in an amount of about 3.5 wt. % of the base asphalt corresponding to bars 148 and 150 had the highest high temperature true grade values of about 82 and about 79, respectively, indicating excellent resistance to rutting. Thus, Honeywell Titan™ 7686 oxidized polyethylene is effective as an anti-rutting polymer.

Accordingly, asphalt paving materials that exhibit resistance to rutting and have improved adhesion between an asphalt binder and aggregate for resistance to stripping have been described. In an exemplary embodiment, the asphalt paving material comprises an asphalt binder and aggregate. The asphalt binder comprises base asphalt and an oxidized polyolefin. The oxidized polyolefins are suitable plastomers for modifying the asphalt binder to reduce or prevent permanent deformation of the asphalt pavement at warmer temperatures caused by the weight, duration, and number of vehicles. In addition, the oxidized polyolefins have been found to act as adhesion promoters between the asphalt binder and the aggregate so as to improve the resistance of the asphalt pavement to moisture damaged caused by stripping. Thus, the asphalt paving material includes an oxidized polyolefin that is effective for reducing or preventing both stripping and rutting, and preferably provides a simplified material that is less costly to produce.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. An asphalt paving material comprising:
an asphalt binder present in an amount of from about 3 to about 8 wt. % of the asphalt paving material, the asphalt binder comprising base asphalt and a polymer, wherein the polymer consists of oxidized high density polyethylene homopolymer and is present in an amount of from about 0.25 to about 10 wt. % of the base asphalt; and
aggregate present in an amount of from about 92 to about 97 wt. % of the asphalt paving material, wherein the polymer effectively adheres the asphalt binder to the aggregate so as to resist stripping of the asphalt binder from the aggregate caused by moisture.

2. The asphalt paving material according to claim 1, wherein the polymer effectively adheres the asphalt binder to the aggregate such that the asphalt paving material has an AASHTO T-283 tensile strength ratio of at least about 0.65.

3. The asphalt paving material according to claim 1, wherein the polymer effectively adheres the asphalt binder to the aggregate such that the asphalt paving material has an AASHTO T-283 tensile strength ratio of at least about 0.75.

4. The asphalt paving material according to claim 1, wherein the polymer is present in an amount of from about 1 to about 4 wt. % of the base asphalt.

5. The asphalt paving material according to claim 1, wherein the polymer has an acid number of from about 5 to about 50.

6. The asphalt paving material according to claim 1, wherein the asphalt binder comprises substantially no anti-stripping agent.

7. A method for preparing an asphalt paving material, the method comprising the step of mixing asphalt binder and aggregate at conditions effective to form the asphalt paving material, wherein the asphalt binder is present in an amount of from about 3 to about 8 wt. % of the asphalt paving material and the aggregate is present in an amount of from about 92 to about 97 wt. % of the asphalt paving material, the asphalt binder comprises base asphalt and a polymer wherein the polymer consists of oxidized high density polyethylene homopolymer and is present in an amount of from about 0.25 to about 10 wt. % of the base asphalt, and wherein the polymer effectively adheres the asphalt binder to the aggregate so as to resist stripping of the asphalt binder from the aggregate caused by moisture.

8. The method according to claim 7, wherein the step of mixing the asphalt binder and the aggregate includes mixing the asphalt binder and the aggregate at a temperature of from about 120 to about 190° C.

9. The method according to claim 7, further comprising the step of combining the base asphalt and the polymer to form the asphalt binder prior to the step of mixing the asphalt binder and the aggregate.

10. The method according to claim 7, further comprising the step of combining the polymer and the aggregate at conditions effective to coat the aggregate with the polymer prior to the step of mixing the asphalt binder and the aggregate, and the step of mixing the asphalt binder and the aggregate includes adding the base asphalt to the aggregate that is coated with the polymer.

11. The method according to claim 10, wherein the step of combining the polymer and the aggregate includes combining the polymer and the aggregate at a temperature of from about 120 to about 190° C.

12. The method according to claim 7, wherein the step of mixing the asphalt binder and the aggregate includes mixing the aggregate and the asphalt binder that comprises substantially no anti-stripping agent.

* * * * *